Figure 1:
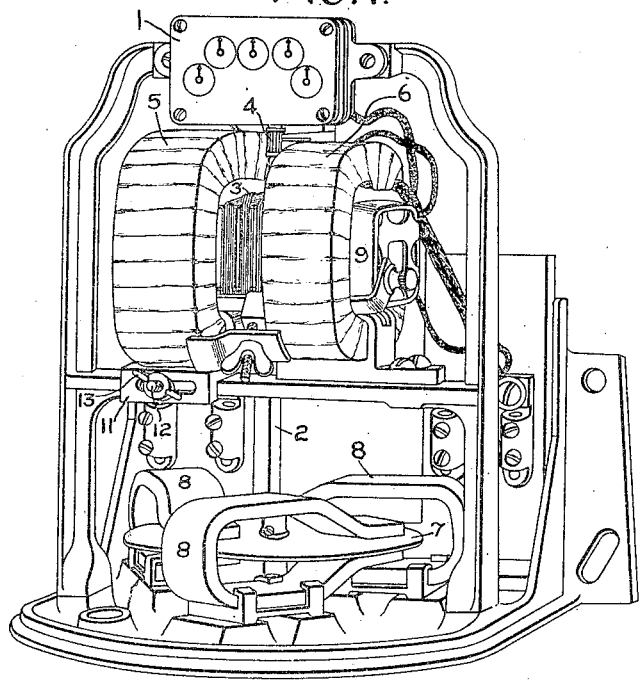

No. 897,024. PATENTED AUG. 25, 1908.
E. SCHATTNER.
SYSTEM OF ELECTRIC METERING.
APPLICATION FILED SEPT. 28, 1904.

Witnesses:

Inventor,
Ernest Schattner.
by Albert G. Davis
Atty.

UNITED STATES PATENT OFFICE.

ERNEST SCHATTNER, OF SCHENECTADY, NEW YORK, ASSIGNOR TO GENERAL ELECTRIC COMPANY, A CORPORATION OF NEW YORK.

SYSTEM OF ELECTRIC METERING.

No. 897,024.      Specification of Letters Patent.      Patented Aug. 25, 1908.

Application filed September 28, 1904. Serial No. 226,327.

*To all whom it may concern:*

Be it known that I, ERNEST SCHATTNER, a subject of the King of Great Britain, residing in Schenectady, county of Schenectady, State of New York, have invented certain new and useful Improvements in Systems of Electric Metering, of which the following is a specification.

This invention relates to systems of electric metering and its object is to provide means for measuring the energy or a factor of the energy consumed by two or more translating devices or sets of translating devices at different rates but limit the use of energy at the lower rate or rates in one or more of the circuits to periods when the load on the station is light.

In installing electrical apparatus, electric translating devices of different classes, such for instance as lights and heaters or lights, heaters and motors, are frequently installed on a consumer's premises and the central station agrees to furnish energy for all the devices but charge for it at rates differing for the several classes of devices in order to encourage the use of certain types of apparatus or of devices consuming a comparatively large amount of power. Energy supplied on this basis can be metered by providing individual meters in the circuits of the several sets of translating devices or by the use of a meter in which the energy consumed by all the devices is registered on a single dial at rates differing for the devices differing in character. In addition to registering the energy consumed in two circuits at different rates, it is sometimes desired to limit the consumption of energy at the low rate in one of the circuits to periods of the day and night when other devices are not extensively used, that is, to periods when the load on the central station is comparatively light, as the energy consumed during the period of maximum load is more expensive to generate since it requires apparatus which is in use only a part of the time. Various clock-controlled attachments for electric meters have been proposed for this purpose which change the rate at which the energy consumed is registered at definite hours of the day and night but these devices are more or less complicated and hence are expensive and liable to breakage.

My present invention relates to means for metering electric energy on this basis and has the advantage that no clock-controlled parts are employed. Instead of changing the rate charged for energy at definite hours I arrange the change of rate to be dependent on the use of the apparatus which constitutes the peak of the load. Thus the maximum load on a central station in almost all cases is in the early part of the evening when practically all the consumers are using lights; during a large part of the day however the load on the station is comparatively light and energy could well be supplied at a lower rate than in the evening to keep the generating apparatus loaded. I therefore provide means whereby the consumption of energy in the devices which constitute the peak load renders it impossible to use energy in the other devices at the low rate.

My invention is particularly useful when lights and heaters are installed on a consumer's premises. To encourage the use of heating devices, it is sometimes agreed that energy consumed in them shall be charged for at a lower rate than for that consumed in the lights but it is not desired to permit the free use of current for heating at the low rate during the period of peak load. In accordance with my invention the energy consumed is registered on a single dial at different rates for the lights and heaters when either of these devices are used by themselves but when both lights and heaters are in use, energy consumed in the heaters is registered at a higher rate, preferably the same as for that consumed in the lights.

Figure 2:
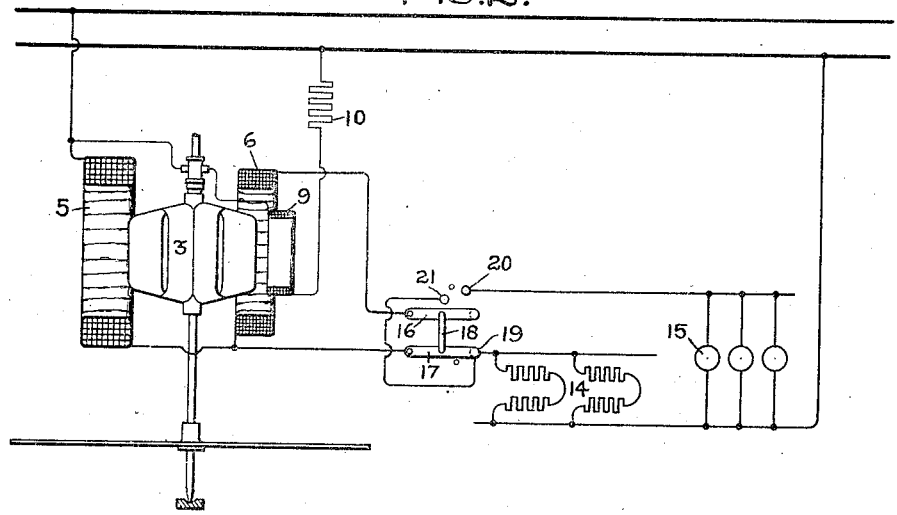

The novel features which I believe to be characteristic of my invention will be pointed out with particularity in the claims appended hereto; the details of construction and the mode of operation of my improved metering apparatus will be better understood by reference to the following description taken in connection with the accompanying drawings which show the preferred embodiment of my invention, and in which Figure 1 is a perspective view of a meter having the casing removed; and Fig. 2 is a diagram of the circuits.

Referring to the drawings, Fig. 1 shows a Thomson recording wattmeter well-known to users of electrical apparatus, having a dial 1 on which the energy consumed is registered and which is geared to a shaft 2 carrying an armature 3 and commutator 4 to the segments of which leads from the armature coils are connected. Field coils 5 and 6 are mounted on opposite sides of the armature 3, and act dynamically upon it to cause rotation of the shaft 2. Mounted on the shaft is a disk 7 of conducting material adapted to move between the poles of damping magnets 8—8 to retard the rotation of shaft 2. An auxiliary field coil 9 nesting within the coil 6 and adjustable toward and away from armature 3 is connected in series with the armature and a resistance 10 across the lines to compensate for friction in the meter. As shown in Fig. 2 the field coil 5 is composed of a small number of turns of large wire relatively to coil 6. The ratio of the number of turns in coil 5 to that in coil 6 is preferably such that the ratio of the dynamic effects of coil 5 and coils 5 and 6 on armature 3 is the same as the ratio of the rates to be charged for the heating and lighting energy. In order to render the relative dynamic effects of the coils adjustable, I mount the coil 5 on a support 11 having a slot therein and provide a threaded bolt 12 on the frame of the meter which extends through this slot and carries a hand-nut 13 so that the position of coil 5 may be adjusted and the coil then secured in place.

Heaters and lights installed upon a consumer's premises are indicated at 14 and 15 respectively. A double-pole switch having blades 16 and 17, independently-pivoted and connected by a cross-bar 18 of insulating material, is mounted in a convenient position and connected in circuit between the meter and the lights and heaters. The positive side of the circuit is connected to the field coil 5 of the meter and coils 5 and 6 are connected in series; the other side of coil 6 is connected to the blade 16 of the double-pole switch. From the series connection of the field coils 5 and 6 a lead is carried to the blade 17 of the double-pole switch. A stud 19 connected to one side of the heaters 14 is mounted so as to be engaged by the blade 17 in one position of the double-pole switch. When the switch is thrown to the position in which blade 17 is out of engagement with stud 19, the blade 16 engages two studs 20 and 21. Stud 20 is connected to one side of the lights 15 and stud 21 to the stud 19.

As shown in Fig. 2, the lights 15 are disconnected from the circuit and the heaters 14 may be used at the low rate for energy consumed therein as the heating current passes through only the coil 5 of the meter and then direct to blade 17 of the switch, stud 19 and through the heaters. The consumer can thus use energy for heating purposes at the low rate during the day while he does not care to use his lights, but he cannot use the lights as there is no connection to stud 20 which is connected to the positive side of the lamps 15. When it is desired to use the lights, the double-pole switch is moved to the position in which blade 16 engages studs 20 and 21. The lights may then be used, the current for them flowing through both field coils in series, through blade 16 to stud 20 and then through the lights causing a registration of the meter at the high rate, since the entire current consumed flows through both field coils. The heaters 14 may also be used but current consumed in them would have to be paid for at the high rate as the central station is carrying the maximum load when it is desired to use the lights 15. In moving the double-pole switch to the position in which arm 16 engages stud 20, the arm also engages stud 21 and arm 17 disengages stud 19 so that current used in the heaters 14 flows through both coils 5 and 6 in series and then to arm 16, stud 21 and to the heaters thereby causing registration of the meter at the same rate for energy consumed in the heaters as for that consumed in the lights. Thus a single meter measures energy consumed in both the lights and heaters, and registers the energy consumed in the lights always at the same rate and that consumed in the heaters at a high or low rate dependent on whether the lights are or are not in use, that is, whether the load in the central station is high or low.

I desire it to be understood that my invention is not limited to the particular construction or arrangement of connections here shown, since many changes, which do not depart from the spirit of my invention, will be obvious to those skilled in the art; which changes are within the scope of the present claims.

What I claim as new and desire to secure by Letters Patent of the United States, is,—

1. The combination of two sets of translating devices, an electric meter of the motor type having two field coils, and means for connecting both said field coils in series with one set of translating devices, or opening the circuit of that set and connecting one field coil in series with the other set of translating devices.

2. The combination of two sets of translating devices, an electric meter of the motor type having two field coils, and means for connecting both said field coils in series with both sets of translating devices or one field coil in series with one set.

3. The combination of two sets of translating devices, an electric meter of the motor type having two field coils, and means for connecting both said field coils in series with both sets of translating devices or one field coil in series with one set and the other set disconnected from circuit.

4. The combination of an electric meter of the motor type having a plurality of field coils, a plurality of circuits, translating devices therein, and a switch for connecting the field coils of the meter in different relations to the several circuits.

5. The combination of an electric meter of the motor type having a plurality of field coils of different numbers of turns, a plurality of circuits, translating devices therein, and a switch for connecting the field coils of the meter in different relations to the several circuits.

6. The combination of a plurality of circuits, an electric meter of the motor type having a plurality of field coils of different numbers of turns connected in circuit therewith, and means for changing the connection of said coils with respect to one of said circuits and simultaneously opening or closing another of said circuits.

7. The combination of two circuits, an electric meter of the motor type having two field coils connected in series, means for connecting said coils in series with both of said circuits, and means for connecting one of said field coils in series with one of said circuits and simultaneously opening the other circuit.

8. The combination of an electric meter of the motor type having two field coils arranged to have different dynamic effects on the armature, a plurality of circuits, and means in one position connecting said circuits in series with both of said coils and in another position connecting one circuit in series with one coil and simultaneously opening the other circuit.

In witness whereof, I have hereunto set my hand this 27th day of September, 1904.

ERNEST SCHATTNER.

Witnesses:
 BENJAMIN B. HULL,
 HELEN ORFORD.